Nov. 29, 1932.   L. HAMMOND   1,889,729
CARD TABLE WITH AUTOMATIC DEALING MECHANISM
Filed Oct. 12, 1932   7 Sheets-Sheet 1

Inventor:
Laurens Hammond
By Williams, Bradbury, McCabe & Hinkle
Attys.

Nov. 29, 1932.  L. HAMMOND  1,889,729
CARD TABLE WITH AUTOMATIC DEALING MECHANISM
Filed Oct. 12, 1932   7 Sheets-Sheet 2

Inventor:
Laurens Hammond
By Williams, Bradbury, McCaleb & Hinkle
Attys.

Nov. 29, 1932.    L. HAMMOND    1,889,729
CARD TABLE WITH AUTOMATIC DEALING MECHANISM
Filed Oct. 12, 1932    7 Sheets-Sheet 6

Inventor:
Laurens Hammond
By
Williams, Bradbury, McCaleb & Hinkle
Attys.

Patented Nov. 29, 1932

1,889,729

UNITED STATES PATENT OFFICE

LAURENS HAMMOND, OF CHICAGO, ILLINOIS

CARD TABLE WITH AUTOMATIC DEALING MECHANISM

Application filed October 12, 1932. Serial No. 637,402.

My invention relates generally to playing card shuffling and dealing machines, and more particularly to an improved mechanism incorporated in a folding bridge table and capable of automatically performing the functions of shuffling and dealing a deck of cards to the four players.

There have been a number of proposals, in the past, to provide machines capable of shuffling or dealing playing cards, or both, but such machines have not proved satisfactory for various reasons. The objections to machines of this type in the past have been that they did not shuffle the cards thoroughly, and did not accurately deliver the cards in such manner that the hand of each player was incapable of being seen by the other players. Another difficulty which has rendered most of these attempts to solve the problem inoperative, has been their failure to incorporate practical means for handling the cards one at a time, irrespective of the condition of the cards. Some machines of this type might have operated on perfectly new and unbent cards but would have operated erroneously upon cards which were slightly worn, or cards which had been soiled and which thus tended to adhere to one another. As a consequence, none of these prior machines proved commercially practical.

A further disadvantage is that in the various card shuffling machines which have been proposed, reliance was placed upon mechanical means for shuffling which, in fact, shuffled in accordance with a predetermined sequence, so that a person familiar with the method of operation of the machine could predict the order, or the approximate order, in which the cards would be delivered from the machine.

A card shuffling and dealing machine, to be acceptable to card players, must be incapable of being used by one or more of the players to his dishonest advantage, and therefore must be capable of operation in an unpredictable but certain manner. The apparatus should be relatively simple and should be portable. An adequate mixing or shuffling of the cards must be assured and yet this operation must take place with such irregularity that no one can predict the cards which will be dealt to the individual hands, or even predict the probable contents of the hands.

My present invention is a distinct departure from the prior art proposals in that it combines the operations of shuffling and dealing in a simple machine incorporated in the top of a card table and delivers the hands directly to the respective players.

It is therefore among the objects of my invention to provide an improved automatic card dealing mechanism incorporated in the top of a bridge table, in which the deck of playing cards may be placed, and which will automatically perform the function of shuffling and dealing the hands to the players in a manner such that no cards will be exposed and such that the distribution of the cards cannot be predicted.

A further object is to provide a mechanism of the above mentioned type in which a practically infinite number of different hands may be dealt to the players.

A further object is to provide a mechanism of the above mentioned type in which the cards constituting the hands of each of the players are delivered, respectively, into pockets not visible to the other players.

A further object is to provide a mechanism of the above mentioned type in which the operation of shuffling, as such, is eliminated and the cards are dealt in one of a plurality of different irregular orders such that the cards are divided into hands of equal numbers.

A further object of my invention is to provide an improved method of distributing playing cards to the players, in which the function of shuffling the cards is incorporated in the operation of dealing them.

A further object of my invention is to provide an improved power operated playing card dealing mechanism which will automatically start upon insertion of a deck of cards in the proper position, and will automatically stop upon the completion of the operation of dealing the cards.

A further object is to provide an improved bridge table in which automatically operable mechanism for simultaneously "shuffling" and dealing a deck of playing cards is incorporated.

A further object is to provide an improved "picker" mechanism for removing one card only from a deck of playing cards.

A further object is to provide an improved "picker" mechanism capable of removing the cards, one at a time, from a deck of playing cards, irrespective of slight variations in the physical properties of the cards themselves, and which will thus be operable upon playing cards even though the edges of the latter may be worn considerably and the cards may be in such condition that they are difficult to shuffle manually.

A further object of my invention is to provide an improved mechanism for distributing cards to specified stations.

A further object is to provide an improved card dealing mechanism, in the dealing operation of which the function of a shuffling operation is performed and in which the hands dealt by the mechanism are unpredictable.

A further object of my invention is to provide a card dealing mechanism of the above mentioned type having controlling mechanism which cannot be surreptitiously tampered with to alter or predetermine the operation of dealing the cards.

A further object is to provide an improved control mechanism for card dealing machines whereby the cards are, in effect, shuffled as they are dealt, in substantial accordance with the laws of probability.

A further object is to provide an improved mechanism for dealing the fifty-two cards of a standard deck of playing cards into four hands, each containing thirteen cards, without dealing the cards sequentially.

A further object is to provide an improved mechanism for automatically stopping the machine after the dealing operation has been completed.

A further object of my invention is to provide an improved means for initiating the operation of the machine upon insertion of a deck of playing cards.

A further object of my invention is to provide means for preventing the insertion of cards or removal of cards from the machine during the operation of the machine.

A further object is to provide an improved bridge table incorporating a mechanism for shuffling and dealing the playing cards, which is simple in construction, light in weight, and in which the legs may be folded, and which may be economically manufactured.

Other objects will appear from the following description, reference being had to the accompanying drawings, in which.

General description

It is believed that the detailed description of the invention will be more readily comprehended if it is read with a previous general knowledge of the function and operation of the mechanism as a whole. The following brief description is intended to furnish this general understanding of the invention.

The exemplary embodiment of my invention herein illustrated and described comprises a practically conventionally formed card table, preferably of the regular portable folding-leg bridge table type. The table is preferably provided with a removable top and a fixed top spaced a few inches below the removable top, the space between the tops serving as a compartment for the operating mechanism.

Each side of the table is provided with a card receiving receptacle or pocket and, in addition, one of the sides has an opening for a deck tray or drawer by means of which the deck of cards to be dealt is inserted into proper position for engagement by the dealing mechanism. When a deck of cards is thus inserted, a motor switch is automatically closed, thereby initiating the operation of the dealing mechanism, and the deck tray is locked against withdrawal.

The dealing mechanism operates through fifty-three cycles to deal a standard deck of fifty-two playing cards into four hands of thirteen cards each. During the latter part of the last cycle of one dealing operation and the first part of the first cycle of the following dealing operation, no cards are dealt. For convenience in this description, this non-dealing operation will be referred to as the first cycle. The first cycle is employed to index a distribution control device, thereby shifting the phase of this device with respect to the actual dealing operation, and causing each of fifty-two successive complete dealing operations to take place in accordance with entirely different sequences of individual card dealing operations.

After this first "blank" cycle, a card picker mechanism slides one card from the deck, the separated card being engaged by a carrier which conveys the card along a track to one of four card receptacles. Control means are provided to "switch" the cards from the track into the pockets in a certain irregular order, thereby in effect shuffling the cards as they are dealt. The control means is so constructed that the distribution of the cards is substantially in accordance with the laws of probability based upon the assumption of a mathematically perfect shuffling operation.

After all of the cards have been dealt, the deck drawer is automatically released and the motor switch opened. The mechanism is then in condition for a second dealing operation.

The card table

Figure 1:
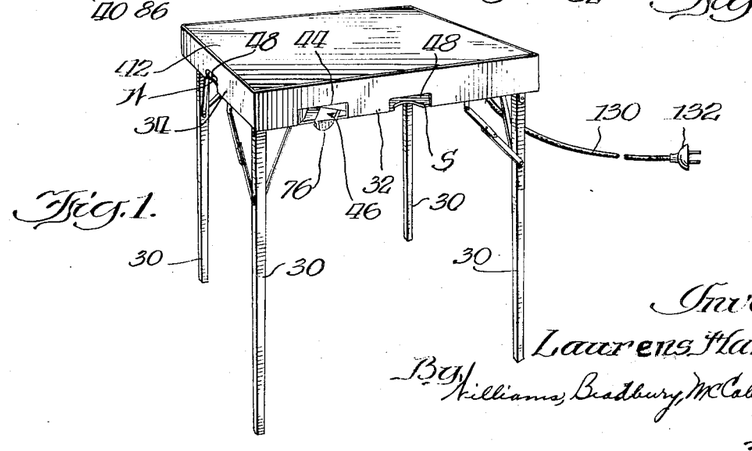
Fig. 1 is a perspective view of the folding card table.

The card table (Figs. 1 and 2) comprises four folding legs 30 which are hinged in a conventional manner to the sides 32, 34, 36 and 38. A sheet 40 of cardboard, ply-wood, or other suitable material is secured to the sides 32, 34, 36, 38, and forms the floor for the operating mechanism compartment. A top 42, which may be of any suitable construction, is removably mounted on the sides 32, 34, 36, 38, so that it may readily be raised for observation, inspection or repair of the card dealing mechanism.

The side 32 is provided with an opening 44 for a deck tray designated generally 46. Card receptacles, S, W, N and E, are provided to receive the dealt hands, these receptacles being positioned adjacent sides 32, 34, 36 and 38, respectively, and are readily accessible to the respective players seated in their usual positions at the table, through openings 48 formed in the sides.

Deck inserting tray

The deck inserting tray 46 is mounted for sliding movement upon a sheet 50. The latter has an upwardly extending flange 52, which is bolted to one of a pair of angle irons 54, 56, which are secured at their ends to the sides 32 and 36. The sheet 50 is provided with a pair of sheet metal angle drawer guides 58 and 60, which are suitably secured to the sheet 50. The inner edges of the guides 58 and 60 are bent downwardly to form rabbet grooves for the drawer slide 62. The drawer or deck receiving tray comprises a channel-shaped sheet metal part having a bottom 64 riveted to the slide 62 and vertical side walls 66 and 68. It will be noted that the vertical flange or drawer guide angle iron 58 is shorter than the corresponding flange of the angle iron 60, so that when the drawer tray is in the position taken during the normal operation of the machine, the deck tray 64 is open at its inner left hand end (Fig. 3), so as to permit sliding of the cards from the tray. The vertical flange of the angle 60 is cut away at 70 to permit the passage of the card picker, as will hereinafter appear. Similarly, the flange 68 is cut away at 72 to prevent possible interference with the foot of the picker guide arm 74. The deck tray slide 62 is provided with a depending handle portion 76 for inserting and withdrawing the tray.

Figure 3:
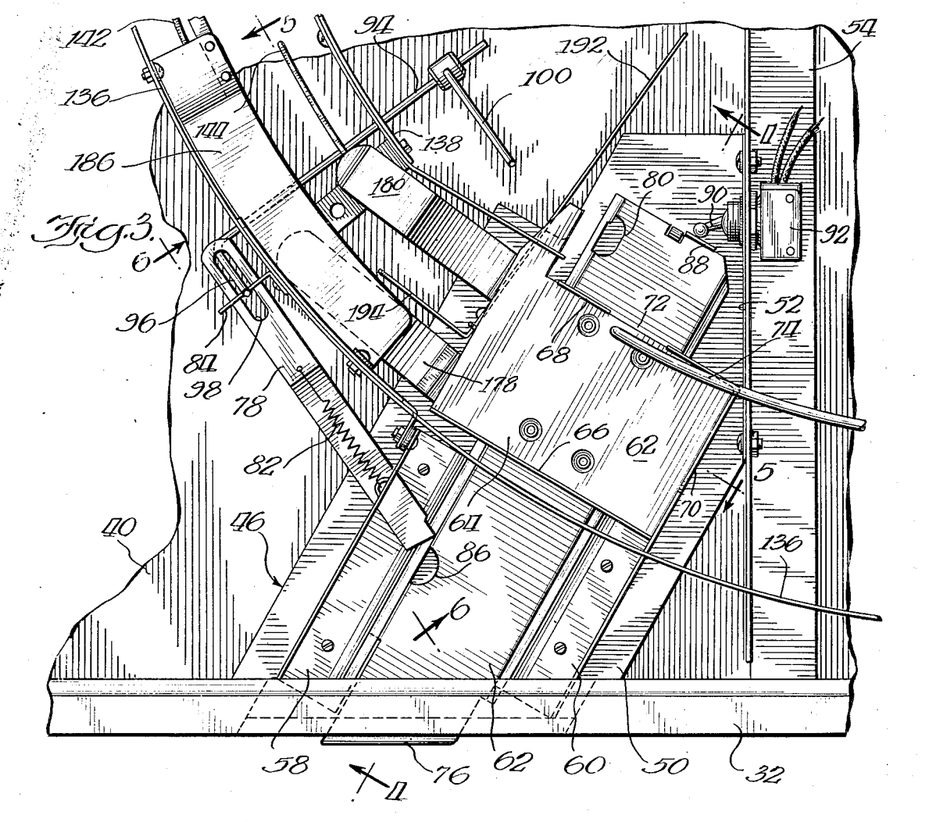
Fig. 3 is a fragmentary plan view of the deck tray or drawer and associated parts.

As shown in Fig. 3, the card tray is in normal position when the mechanism is not operating. By manually grasping the handle 76, the slide 62 may be drawn outwardly until the right hand end (Fig. 3) of the tray 64 projects beyond the side wall 32, so that the deck of cards may be inserted. Outward sliding movement of the slide 62 is limited by the engagement of the end of a latch bar 78 in a notch 80 formed in the slide 62. The latch is normally urged to the right by a tension spring 82 and is guided for reciprocatory movement in a suitable slot formed in the flange of the angle iron 58 and by a bracket 84 which is suitably secured to a rigid part of the mechanism. When the slide is moved inwardly to fully operative position, the end of the latch 78 will engage in a notch 86 formed in the slide 62, thereby locking the slide and deck tray in operative position. Upon thus pushing the slide 62 inwardly to its operative position, a lug 88, struck upwardly from the slide, is adapted to engage the toggle lever 90 of a motor control switch 92 which is secured to the angle iron 54. The switch is of the well known type in which a spring is incorporated to hold the switch in its "off" position (as shown in Fig. 3).

The switch spring is utilized to move the slide 62 and the deck tray to the position shown in Fig. 3, after the completion of the dealing operation, when the latch 78 is withdrawn from the notch 86 in the slide by the trip mechanism. The trip mechanism comprises a rod 94 having an upwardly bent arm 96 projecting through an elongated slot 98 formed in the latch 78. The rod 94 is mounted for pivotal movement and at its end opposite the arm 96 has an upwardly extending arm 100 secured thereto.

At the end of the dealing operation, as will hereinafter appear, a part engages the arm 100 and swings it upwardly and to the left (Fig. 3), thereby causing the arm 96 to engage in the outer end of the slot 98 and withdraw the latch 78 from the notch 86.

*Motor and drive mechanism*

The electric motor 102 (Figs. 11, 12) is preferably a small induction motor, for example, of the type shown in Patent No. 1,822,679, granted September 8, 1931, and is rigidly secured to a supporting plate 104. The downwardly and sidewardly bent flanges 106 of the plate 104 are secured to the angle irons 54, 56, by means of shoulder studs 108, rubber bushings 110 being interposed between the flanges and the studs to minimize vibration and noise. The rotor shaft 112 of the motor 102 has a pinion 114 secured thereto, the pinion meshing with a gear 116 fixed to a pinion 120. A pinion 120, secured to a countershaft 118, meshes with a gear 122 which is peened to a sleeve 124, which is rotatably mounted upon a stud 126, the latter being peened to the plate 104. A channel-shaped turntable 128 is secured to the sleeve 124. Current is supplied to the motor through a suitable extension cord 130 which carries a conventional plug connector 132 at its end. One conductor of the cord 130 is connected directly to the coil of the motor, while the other is connected to one of the terminals of the switch 92. A conductor 134 connects the other terminal of the switch with the field coil of the motor.

From the above, it will be apparent that when the extension cord 130 is connected to a suitable source of electric current and the switch 92 closed, the motor 102 will operate to rotate the turntable 128. The direction of rotation of the motor is such that the turntable will rotate about the stud 126 in a clockwise direction when viewed from the top.

*The card conveyor track*

A track or runway is provided, over which the cards are conveyed from the deck tray to one of the four receiving pockets, W, N, E and S. This track comprises a pair of side rails 136, 138, the outer side rail 136 being in the form of a continuous circle and the inner rail, 138, being continuous except for a break adjacent the card tray. The side rails 136, 138 are preferably strips of thin sheet metal which are bolted together at intervals by ties 140. The ties 140 also serve as supports for a plurality of sections of double track each comprising an outer rail 142 and an inner rail 144, the rails being bolted or otherwise suitably secured to the ties. Several of the ties 140 are supported by brackets 146, which are secured to the sides 32, 34, 36 and 38.

Figure 15:
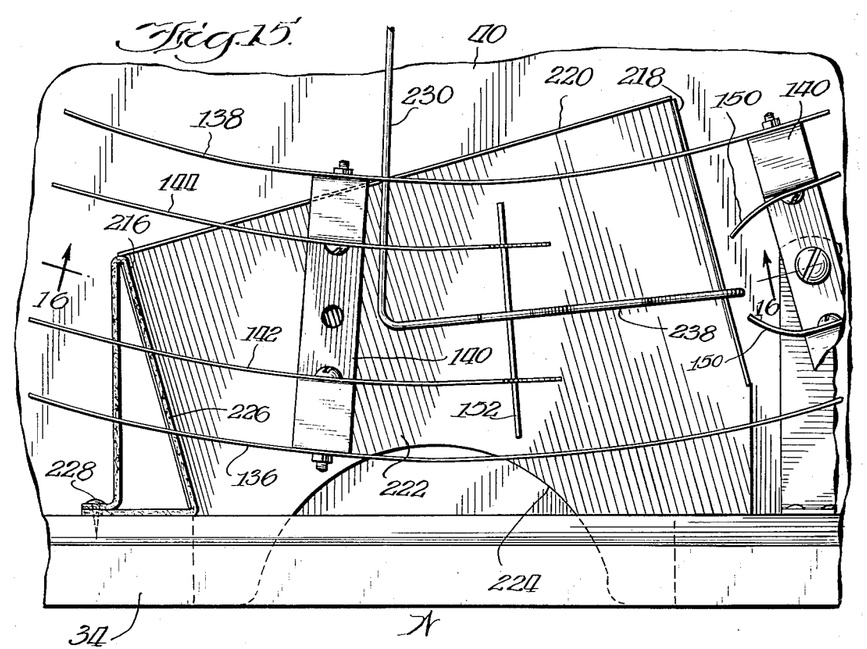
Fig. 15 is a fragmentary plan view of a card receptacle or pocket, illustrating the card switching means.

Stay wires 148, projecting through suitable drilled holes in the rails 136, 138, 142, 144, are suitably crimped to serve as means to hold the rails in properly spaced relation. The ends of the rails 142, 144, are preferably pointed (Fig. 16), while their opposite extremities have inwardly turned end portions 150, as shown in Fig. 15. The pointed ends of the rails 142, 144, are preferably reinforced by a wire 152 which also serves as a stop for the switch arm hereinafter to be described.

*The card pick-up mechanism*

The card picker mechanism comprises a bent arm 154, the inner end of which is mounted for rotation at the end of the turntable 128, the bearing therefor being formed in the side flange of the turntable and in a bracket 156 secured to the turntable. A torsion coil spring 158 is wound about the inner end of the arm 154 and is tensioned to swing the latter downwardly so as to hold a rubber covered roller 160 in contact with the inner side rail 138. A sponge rubber picker thumb 162 is held in a sheet metal clamp 164 which is, in turn, non-rotatably secured to the end of the arm 154 in such position that the sponge rubber will lie substantially over the center line of the track. The sponge rubber thumb is segmental in shape, being slightly greater than semi-circular in cross-section, as best illustrated in Fig. 19.

Figure 18:
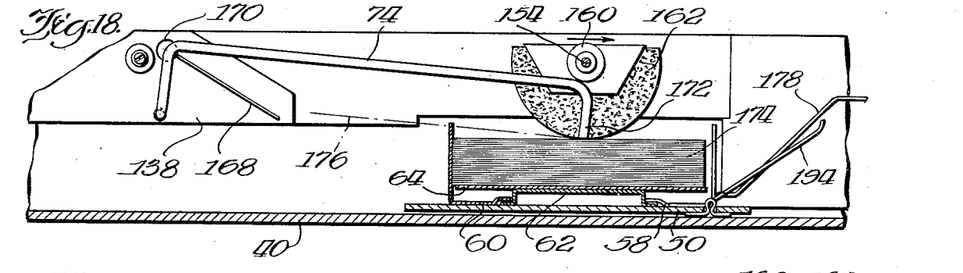

The operation of the picker in removing a card from the top of the deck of cards placed in the deck tray 64 is best illustrated in Figs. 17, 18, 19 and 20. As the arm 154 approaches the card tray, its roller tends to ride down the inclined end edge 166 of the inner track 138. As the roller 160 leaves the rail 132, it rolls downwardly upon the guide arm 74, which is normally held in the position shown in Fig. 17, by a bent wire hairpin-shaped spring 168 (see Fig. 2), one end of which extends through both side rails 136, 138, and the other end of which projects through a hole 170 in the side rail 138. This spring 168 is weaker than the spring 158, so that, as the picker roller 160 rides downwardly upon the arm 74, the latter will swing downwardly until its foot 172 is stopped by the deck of cards 174 in the card tray 64, as shown in Fig. 18. The foot 172 is of such length that, as the roller 160 is about to move from the end of the guide arm 74, the spring rubber picker thumb will contact with the topmost card of the deck.

It will be noted, as indicated by the dot and dash line 176, in Fig. 18, that the sponge rubber picker thumb 162 approaches the surface of the topmost card of the deck at an acute angle at a point substantially at the center of the card.

Figure 2:
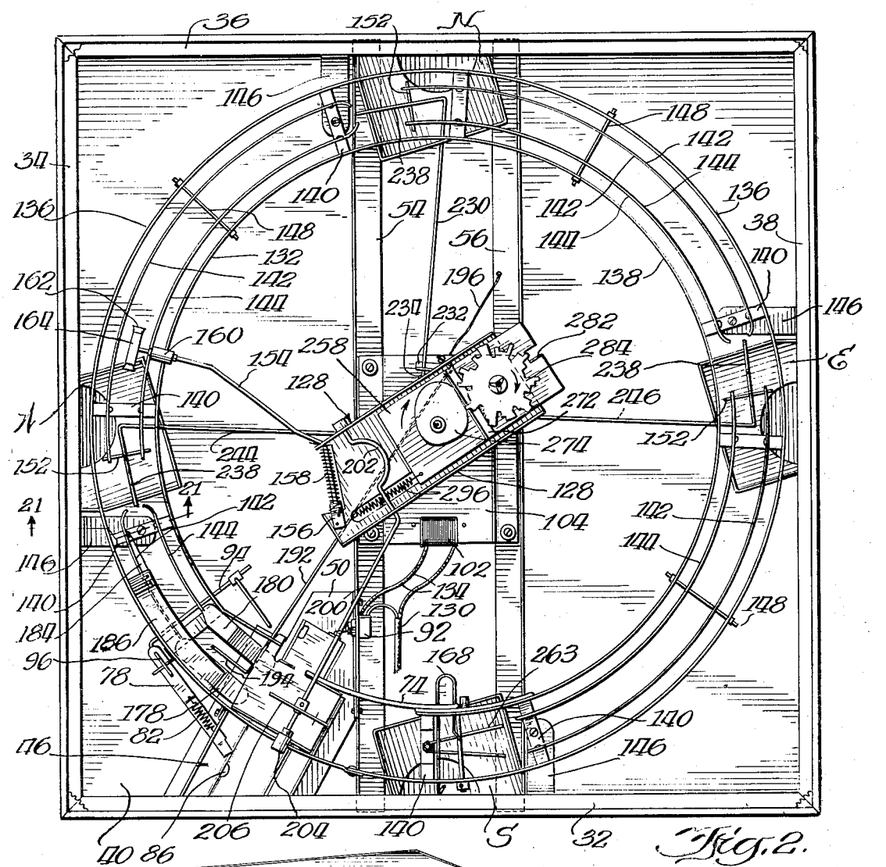
Fig. 2 is a plan view thereof with the top removed.
Figure 4:
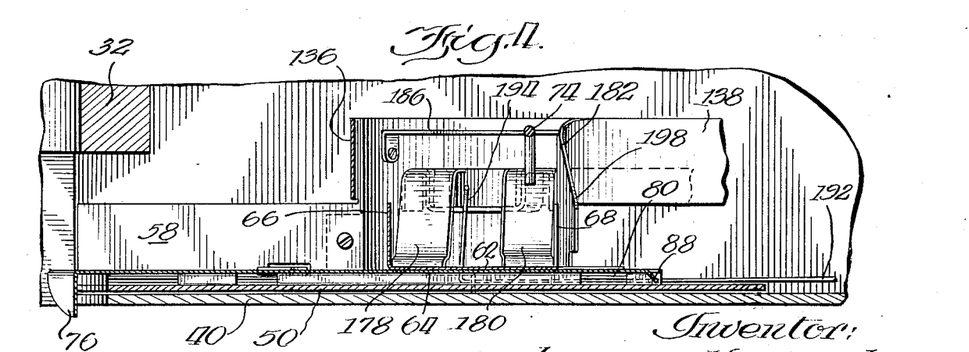
Figs. 4, 5 and 6 are fragmentary vertical sectional views taken on the lines 4—4, 5—5 and 6—6, respectively, of Fig. 3.
Figure 19:
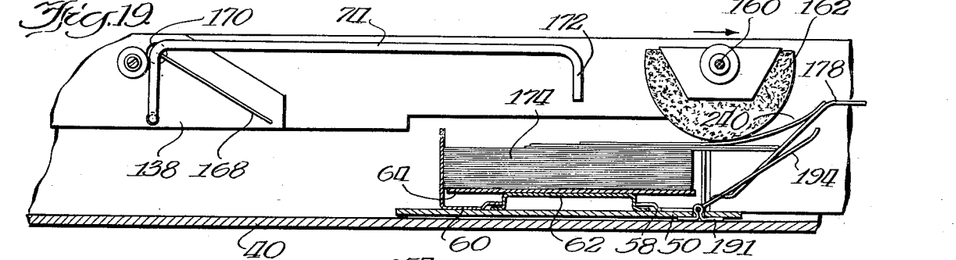

Since the coefficient of friction between the sponge rubber and the surface of the card is greater than that between the lower surface of the card and the upper surface of the next topmost card, the top card will usually slide freely from the top of the deck to the position shown in Fig. 19, with comparatively little displacement of the remaining cards of the deck. However, occasionally the lower cards will tend to adhere to the top card and slide along with it, as shown in Fig. 19, where the second and third cards have moved along with the top card for an appreciable distance. The topmost card is, however, separated from the second and third cards, and any other cards which may tend to move along with the top card, by being forced up a pair of inclined guides 178, 180 (Figs. 2 and 4). These guides have their lower ends secured to the tray support sheet 50 and have their upper ends free. These guides serve as a guard against which all except the first card abut and are restrained. The first card, however, will bend slightly upon being pushed against the guides 178, 180 so as to commence sliding up the guides, as indicated in Fig. 19. Since when in this position the downward pressure exerted by the picker thumb 162 upon the card is transmitted, in part, from the topmost card to the inclined guides 178, 180, and only in part to the second and third cards which may have commenced to move with the topmost card, the total friction between the topmost card and the second card is sufficiently reduced that there will be no tendency for the second or any subsequent cards to be forced upwardly upon the inclined guides 178, 180.

Figure 20:
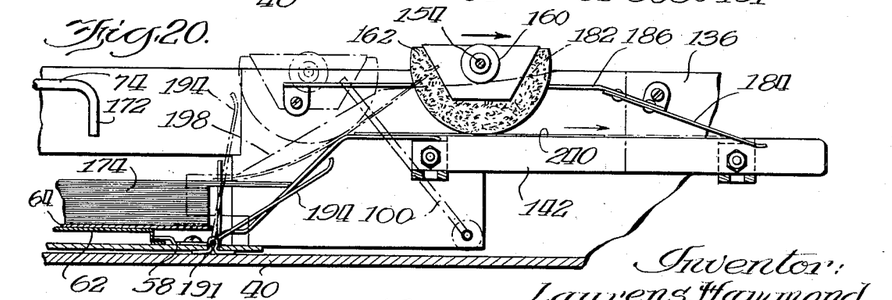
Figure 21:
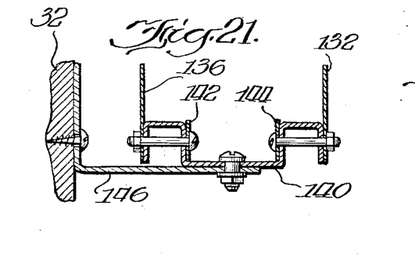
Fig. 21 is a transverse sectional view of the track and its support.

As the picker thumb 162 advances, the total friction is gradually further reduced until the topmost card is moved entirely from contact with the remaining cards (just subsequent to the time when the parts are in the position shown in dotted lines in Fig. 20), and the topmost card will thus be slid along off the inclined guides 178, 180, upon the rails 142, 144.

Figure 5:
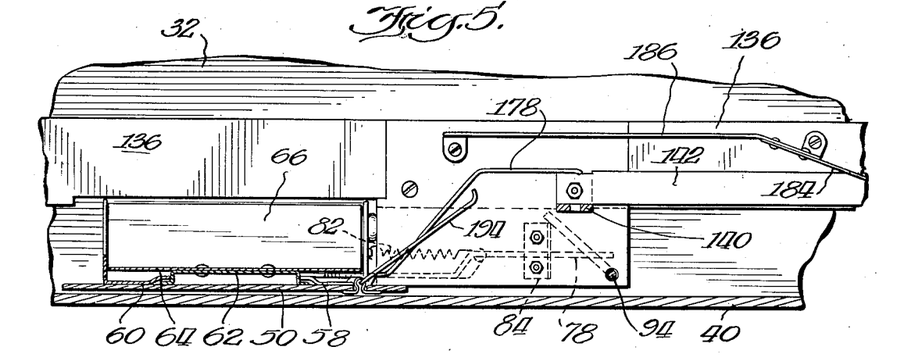
Figure 6:
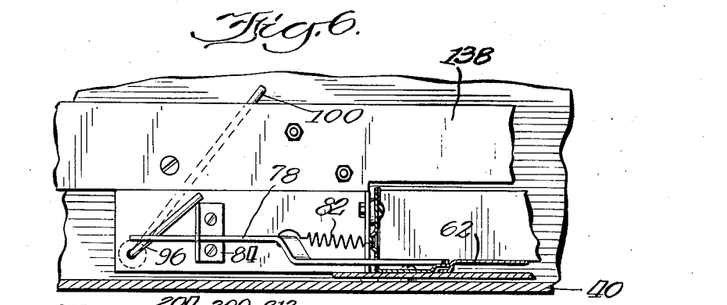
Figure 14:
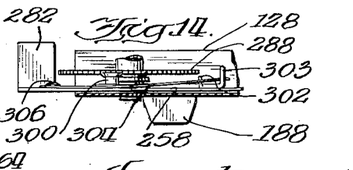
Fig. 14 is a fragmentary vertical sectional view of the indexing mechanism taken on the line 14—14 of Fig. 13.

Shortly after the card is slid upon the rails 142, 144, the rubber roller 160 commences rolling up an inclined portion 182 formed upon the inner track 138 and the sponge rubber picker thumb is thereby raised from contact with the card. Due to its inertia, the card will, however, continue its forward movement along the track until arrested by a flat spring 184, which is carried by a supporting bracket 186, the latter being secured to the side rail 136. Thereafter the picker thumb continues to ride with its roller 160 on the inner rail 136, until it has made substantially a complete revolution, whereupon it again picks a card from the top of the deck and moves it up on the track in a position where its end abuts the stop spring 184. Sometime after the completion of the operation of separating the topmost card from the remaining deck of cards, a lug 188 (Fig. 14), struck downwardly from the turntable 128, abuts against the upturned end 190 of a deck wire 192 (Fig. 11) which extends beneath the motor assembly, and at its opposite end has an upwardly bent deck wire arm 194 (Fig. 20). The deck wire 192 is mounted in suitable bearings 191 (Fig. 20) and 193 (Fig. 11), and has one end of a fine torsion spring wire 196 connected thereto, the other end of the spring being anchored to the angle iron 56. This torsion spring wire normally holds the deck wire arm 194 in the position in which it is shown in Figs. 5, 19 and 20. When, however, the lug 188 strikes the upwardly bent end 190 of the deck wire 192, the latter is rotated counter clockwise (Fig. 20) from the position in which it is shown in full lines, to the position slightly beyond that in which it is shown in dotted lines, thereby restoring any of the cards which may have been displaced to proper superposition. As soon as the lug 188 wipes past the arm 190, the torsion wire spring 196 will restore the deck wire 192 to normal position with the arm 194 in the position in which it is shown in full lines in Fig. 20.

The picker mechanism continues operating to remove one card at a time from the deck until all of the cards have been removed, whereupon the arm 154 will engage the arm 100 of the deck tray release latch mechanism and actuate the latter, as previously described. It will be understood that when the picker thumb is in engagement with a card, as indicated in dotted lines in Fig. 20, the arm 154 will be raised above the end of the arm 100 so as not to contact therewith. When, however, the card tray has been emptied, the picker thumb 162 will pass between the inclined guides 178, 180, and ride up the inclined edge 198 (Fig. 20) and engage the end of the arm 100, to swing the latter clockwise and thereby release the tray latch, with consequent opening of the motor switch 92, stopping the machine.

*The card conveying and switching mechanism and selector therefor*

In the previous description, the mechanism for removing the cards one at a time from a deck and to the position in which their ends abut the spring stop 184, has been explained. Mechanism presently to be described is provided to convey the cards, one after another, from the position in which they are left by the picker mechanism to one of the four card receptacles, S, W, N, E. The conveying mechanism comprises an arm 200, which is pivotally mounted in the side flanges of the turntable 128, the extent of upward movement of the outer end of the arm being limited by the contact of a bowed portion 202 of the arm with the surface of the turntable 128.

The extremity of the arm 200 has a tubular felt sleeve 204 suitably secured thereto, this sleeve sliding over the outer rail 136. The arm 200 also has a carrier 206 (Fig. 7) secured thereto, the latter being positioned so as to pass above the tracks 142, 144, and has a depending stop portion 208 which passes between the tracks 142, 144. A flat spring buffer 210 has one end tightly pinched in a suitable vertical slot 212 formed in the carrier 206. The carrier bracket 206 has an inclined lower edge 214, which tends to deflect the edges of the cards downwardly into engagement with the spring buffer 210.

It will be noted that the arm 200 extends from the turntable at an angle of slightly less than 90° with respect to the arm 154, and follows the latter along the track. Thus, after the picker thumb has deposited a card against the stop spring 184, the buffer spring 210 of the carrier bracket 206 will contact with the rear edge of the card and push it past the stop spring 184, the latter being deflected upwardly sufficiently for this purpose. Thereafter the card will be pushed along the track by the carrier until it reaches the pocket in which it is to be deposited.

Figure 16:
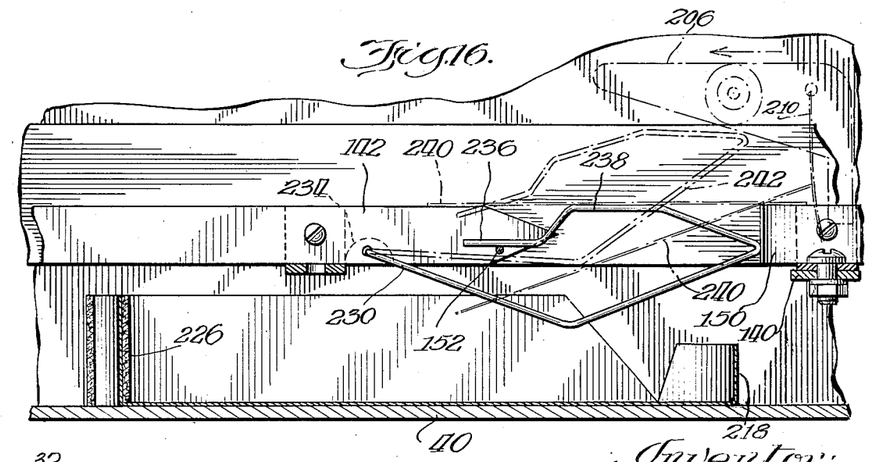
Fig. 16 is a developed vertical sectional view taken on the arc 16—16 in Fig. 15.
Figure 17:
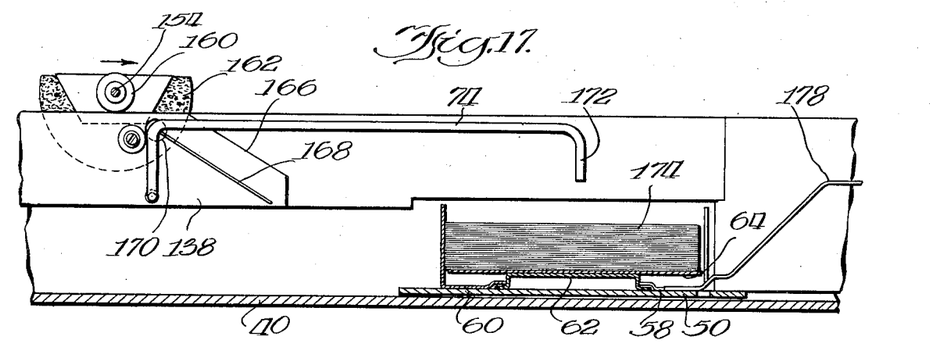
Figs. 17, 18, 19 and 20 are developed vertical sectional views of the card picker mechanism showing the parts in various displaced positions to illustrate the method of operation.

As best illustrated in Figs. 15 and 16, the pockets S, W, N, E, which are similar in shape, are formed from sheet metal and are secured to the sides 32, 34, 36, 38, respectively. The pockets or receptacles have upwardly extending end flanges 216, 218, and a side flange 220. The bottoms 222 of each of the pockets have semi-circular notches 224 cut therein to facilitate removal of the cards from the pockets. The end wall 216 of each of the pockets has a felt strip 226 covering its inner face, the strip being preferably tacked to the side of the table, as indicated at 228, in Fig. 15.

The card switching device for the N card receptacle or pocket comprises a wire 230 (Figs. 2, 11, 15 and 16), the inner end thereof being rotatably supported by a bracket 232 and the outer end thereof extending through a suitable bearing hole in the inner side rail 138. The inner extremity of the rod or wire 230 is bent upwardly, as at 234. The outer end of the card switch rod 230 is bent to form a card switch, as shown in Fig. 16, with the normally horizontal extremity 236 thereof resting upon the tie wire 152. The card switch has a raised horizontal portion 238 which normally lies substantially at the level of the upper edges of the rails 142, 144, so that if a card is to pass over the switch it will at all times be supported at at least three points at the same level and will therefore not tend to tip. As the card arrives at the switch, it is first supported by the rail ends 150 and the horizontal portion 238 of the switch. Thereafter, it is supported by the rail ends 150, the horizontal portions of the switch 238 and the two ends of the following section of the rails 142, 144. A card 240 is shown in dotted lines in Fig. 16 in the position last described. Thereafter, the card will be supported by the horizontal portion 238 of the switch and the rails 142, 144, of the left hand section (Fig. 16).

When a card is to be deflected from the track into a card receptacle, W, N, or E, its switch is raised to the position shown in dotted lines in Fig. 16, whereupon a card arriving at the open switch will strike the downwardly sloping portion 242 of the switch and be pushed into the card receptacle. Each of the pockets, W, N, E, is provided with a card switch mechanism, as just described, the switch rod for the card receptacle W being designated by the reference character 244, and the switch rod for the card receptacle E being designated by the reference character 246.

Figure 11:
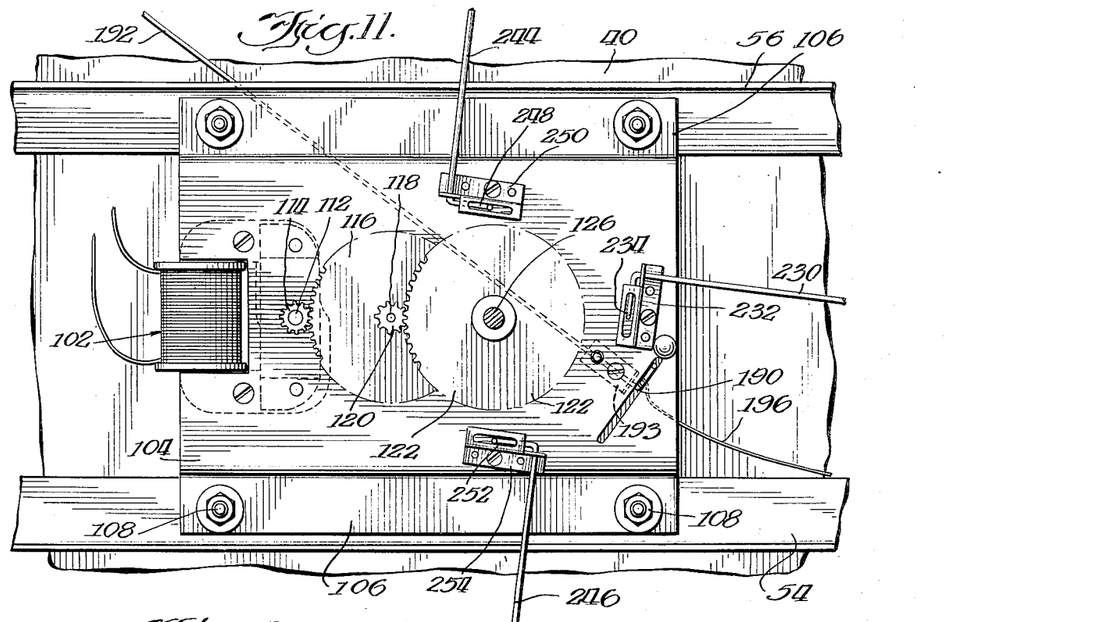
Fig. 11 is a horizontal sectional view taken on line 11—11 of Fig. 10.
Figure 12:
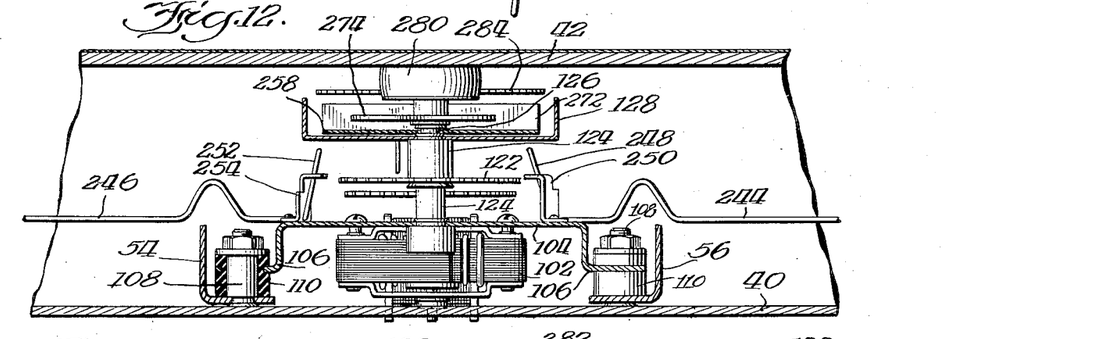
Fig. 12 is a transverse vertical sectional view taken on the line 12—12 of Fig. 9.

Referring to Fig. 11, the switch rod 244 has an upwardly extending arm 248, at its inner extremity, the rod being guided in the bracket 250. The switch arm 246 has a similar upwardly bent end portion 252 guided in a bracket 254. The ends 248, 234 and 252, of the switch rods for the card receptacles W, N and E, respectively, are located different distances from the center of rotation of the turntable 128. In the illustrated embodiment, the end 248 of the W switch rod lies nearest the center of the stud 126, the extremity 152 of the E switch rod the farthest from the center of said stud, and the extremity 234 of the N switch rod lies at an intermediate distance therefrom.

The extremities 248, 234 and 252 are adapted to be contacted and swung downwardly by a switch rod actuator 256, which is secured to a plate 258 by a pair of rivets 260, the rivets projecting through an opening 262 formed in the turntable 128.

The card receptacle S is not provided with a card switching mechanism, since it, of course, receives all cards which are not previously delivered to the card receptacles W, N and E. It is, therefore, provided with a pair of diagonally upwardly extending spring fingers 263 (Figs. 2 and 7), which are formed of a single piece of wire bent into V-shape and secured to the tie 140 by means of a bolt 265.

The slide plate 258 is longitudinally reciprocable on the turntable 128, being guided for such movement by a pair of elongated slots 264 and 266, the former embracing the stud 126 and the latter embracing a collar 268 which is mounted on a stud 270.

The slide plate 258 has a sheet metal angle bracket 272 secured thereto transversely at approximately its center, the vertical face of this angle iron being adapted to contact with a stationary cam 274 which is peened to a hub 276. The hub 276 is splined to the hub 126 and carries a washer 278, the latter serving as a support for a rubber cushion 280, against which the table top 42 may rest.

Figure 10:
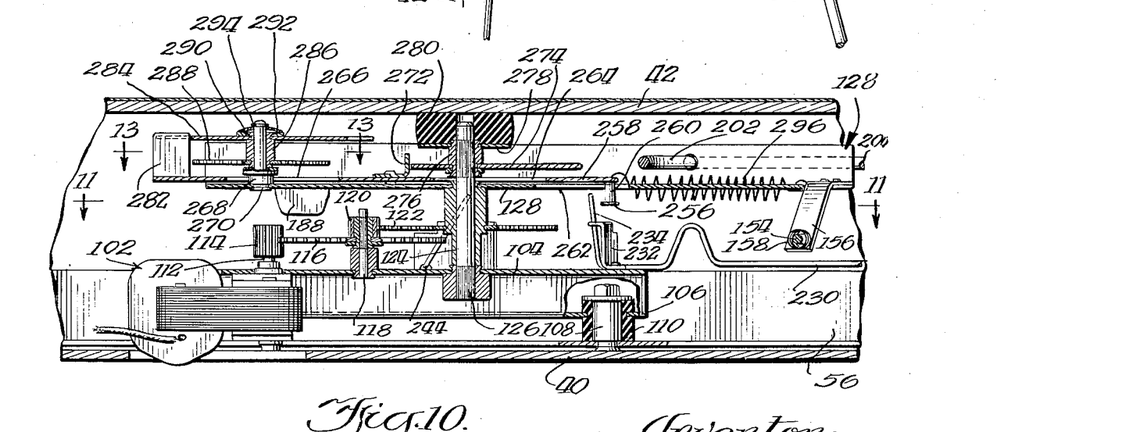
Fig. 10 is a vertical sectional view taken on the line 10—10 of Fig. 9.

The slide plate 258 has an upwardly extending lug 282 struck therefrom, this lug being adapted to move into one of the notches of various depth formed in a notched selector or control plate 284. The plate 284 is peened to a hub 286 which is rotatably mounted upon the rivet 270 and which also has rigidly secured thereto an indexing ratchet wheel 288. The assembly of the notched plate 284, the hub 286 and the indexing ratchet wheel 288, is frictionally held against rotation by a three-armed spring washer 290, the ends of which engage a small friction washer 292 which rests upon the upper surface of the notched plate 284. The washer is secured to the rivet 270 by a split ring 294. The sliding plate 258 is normally pulled to the right (Fig. 10) until the face of the angle plate 272 is in engagement with the cam 274 or the rightward movement of the sliding plate 258 is otherwise limited, by a tension spring 296, one end of which is secured to the sliding plate 258 and the other end of which is anchored to the turntable 128.

Figure 13:
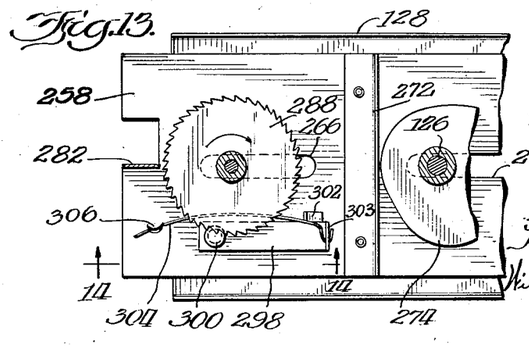
Fig. 13 is a fragmentary horizontal sectional view taken on the line 13—13 of Fig. 10, and illustrating the indexing mechanism.

As best shown in Fig. 13, a pawl 298 is pivoted at 300 to the sliding plate 258 and is normally held in engagement with a stop 302 struck upwardly from the sliding plate 258 by a wire spring 304, which is anchored at 306 to the sliding plate 258. Thus, upon each reciprocation of the sliding plate 258 with respect to the turntable 128, the tooth 303 of the pawl 298 will engage one of the teeth of the index wheel 288 and advance the latter one tooth, or one fifty-second of a revolution, the ratchet wheel 288 having fifty-two teeth. Since the notched selector plate 284 is rigidly secured to the index wheel 288, the former will also be rotated through one fifty-second of a revolution upon each revolution of the sliding plate 258 with respect to the turntable. Since the cam 274 has but one high point, the plate 258 will reciprocate but once upon each revolution of the turntable.

Figures 7, 8:
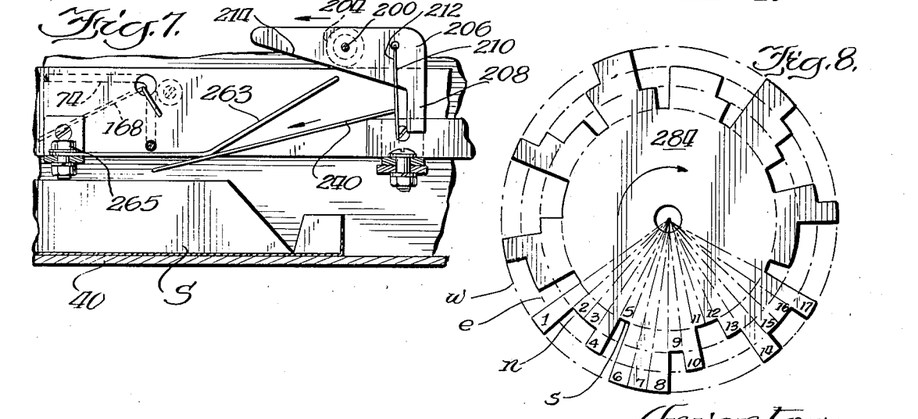
Fig. 7 is a fragmentary vertical sectional view taken through the S receptacle, and illustrating the delivery of a card thereto.
Fig. 8 is a detail plan view of the notched selector or control plate.
Figure 9:
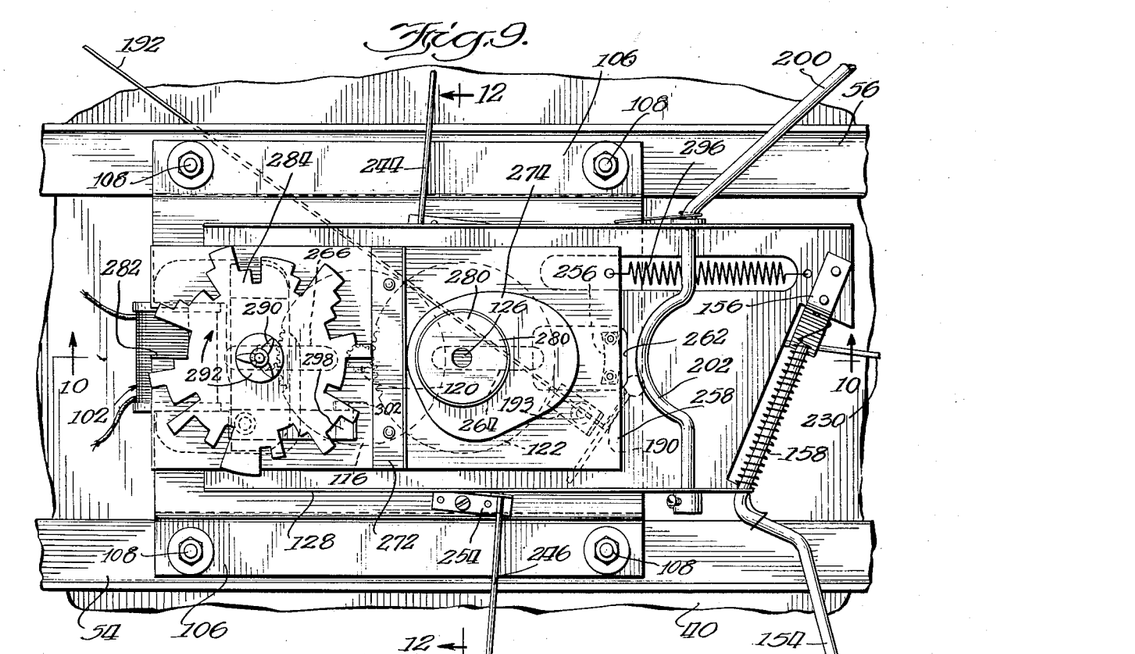
Fig. 9 is a plan view of the central control and actuating mechanism.

As the sliding plate moves to the right (Fig. 9), that is, as it approaches the lowest portion of the cam 274, the selector lug 282 will move radially inwardly with respect to the notched plate 284 until arrested by one of the fifty-two stop faces thereof. As best illustrated in Fig. 8, the notched plate 284 may be considered as divided into fifty-two sector-shaped areas of four different lengths of radius, the arcuate surface of each such imaginary sector forming a stop for the selector lug 282. Since when the selector lug 282 abuts the arcuate stop surfaces farthest from the center, the switch for the W card receptacle will be opened, the dotted circle passing through such surfaces of the notched plate is designated $w$. Similarly the circle passing through the stop surfaces next farthest from the center is designated $e$, the circle passing through the stop surfaces next farthest from the center is designated $n$, and the circle passing through the arcuate stop surfaces nearest the center is designated $s$.

Commencing with the stop surface marked 1, it will be noted that the stop surfaces are arranged in the following order: W, N, N, E, S, W, W, W, N, E, S, S, N, W, E, E, W, S, N, N, N, W, E, S, S, N, E, W, W, S, N, E, E, E, S, N, W, W, E, S, N, N, E, W, S, S, S, N, W, E, E, S.

It will be noted that when the selector lug 282 goes into one of the deepest notches of the plate 284, none of the switches (for the W, N and E card receptacles) is operated, and the card continues around the track until it strikes the stationary deflecting spring fingers 263 at the S receptacle.

The plate 284 may, of course, have any one of a large variety of different arrangements of notches without greatly interfering with the efficacy of the combined shuffling and dealing operation. The notched plate illustrated is, however, believed to be of the most desirable type for insuring a distribution of the cards comparable to that which might have been obtained had the cards been "perfectly" shuffled.

The following is further illustrative of the types of sequences which are most desirable: W, N, N, N, E, N, E, E, W, N, N, W, S, S, S, E, S, W, W, N, S, N, E, S, E, N, S, N, E, E, S, W, W, W, N, W, S, S, W, N, N, W, E, E, E, S, E, W, W, E, S, S.

The number of permutations of a standard deck of playing cards is in the order of $8 \cdot 10^{67}$, and it would therefore be possible to provide this number of different notched selector plates. Only an extremely small proportion of the total number of possible different permutations of the notches on the selector plates would, however, be practical and substantially mathematically correct for use in the dealing mechanism of my invention. It will therefore be understood that when hereinafter sequences of the above listed type are referred to, I intend to include a class of notched selector plates each differing from the other but nevertheless bearing a general similarity to each other and constituting, considering the enormous number of forms in which the selector plate could be made, only an extremely minute fraction of the total.

*Operation*

The operation of the various parts has been more or less completely described, so that it is necessary here merely to give a general description of the operation in order to co-ordinate the previously described operations of the individual parts.

The mechanism is shown in its normal inoperative position in Fig. 2. To initiate the operation of the machine, the "dealer" who will sit at the side of the table adjacent the S pocket, will with his left hand grasp the handle 76 on the card tray slide and withdraw the tray sufficiently to enable him to insert the deck of playing cards in the tray. He will then push the tray slide inwardly until the latch 78 engages in the notch 86 to lock the tray in its operative position. As the tray is pushed into this position, the lug 88 on the tray slide will engage and operate the toggle switch 90, whereupon the motor will commence rotating the turntable 128. After the turntable has rotated approximately 270° from the position shown in Fig. 2, the picker thumb 162 will engage the topmost card of the deck and slide it upwardly to the position in which the card is shown in dotted lines in Fig. 20. The operation of the picker mechanism is fully illustrated in Figs. 17 to 20, inclusive, and has been previously described in detail.

After the turntable has rotated slightly more than 90° further, the spring buffer 210 of the card pusher or carrier 206 will contact with the rearward edge of the card and push it forwardly along the circular track. Depending upon the angular position of the notched selector plate 284 with respect to the selector lug 282, the slide plate 258 will have moved inwardly (prior to the arrival of the card at the W receptacle) a distance such that its depending switch rod actuator 256 will be in a position to engage one of the upturned ends of the switch rods 244, 230, or 246, or will be in a position to rotate in a path beyond the ends of each of these rods, so as not to contact any of them.

Assuming that the selector lug 282 has contacted with the stop surface 1 (Fig. 8) of the selector plate 284, the upturned end 248 of the switch rod 244 will be engaged by the switch rod actuator 256 and swing the card switch at the W receptacle from the full line position of Fig. 16 to the dotted line position, thereby deflecting the first card into the W receptacle. During the latter portion of the first card dealing cycle of the machine, while the card carrier 206 is passing between the E receptacle and the deck tray, the notched selector plate will be indexed through an angle of one fifty-second of a revolution, so as to bring the stop surface 2 (Fig. 8) into alignment with the selector lug 282. The second card will therefore be delivered to the N receptacle in the same manner as the first card was delivered to the W receptacle. The machine will continue operating upon the remaining cards in the deck in the same manner, delivering them to the card receptacles in the sequence previously given. After all of the cards have been removed from the deck tray and delivered to the card receptacles, the picker thumb 162, not being in engagement with a card, will permit the roller 160 to drop to the cam edge 198 (Fig. 20) of the inner rail and the arm 154 will therefore contact with the arm 100 of the tray release mechanism, whereupon the spring in the toggle switch 92 will force the tray from its operating position to the position in which it is shown in Fig. 2.

During the first cycle of the next dealing operation, no cards will be distributed, but the notched control plate 284 will be indexed through an angle of one fifty-second of a revolution and the second deck of cards will be dealt, commencing with the N receptacle and continuing through the sequence above given, terminating with the delivery of a card to the W receptacle, the first in the above sequence. The order of delivery of the cards to the receptacles may therefore be considered to be in a repetitive sequence, as above set forth, in which the dealing operations successively commence at different points in the sequence.

When playing a game of cards such as bridge, whist or a similar game, with the card table of my invention, it is preferable to use two decks, so that the play may proceed with one deck while the other deck is being dealt. The dealing mechanism operates sufficiently rapidly that by the time the players have their respective hands arranged according to suit and card value, the machine will have completed the operation of dealing the next hands. Thus, if in playing bridge, for example, none of the players bid, the next hands will be immediately available to the players.

It will be understood that the general principle of operation employed in the embodiment herein illustrated and described may be incorporated in machines adapted for dealing cards for different types of games in which hands of different numbers of cards are required. In such embodiments, it is necessary merely to incorporate a counting mechanism, the operation of which is initiated when the card tray is inserted in operative position, the counter acting to stop the machine after a predetermined number of cards have been dealt. Of course, a notched selector plate designed appropriately in accordance with the principles herein set forth must be substituted for the notched selector plate herein illustrated. Furthermore, the card table may be constructed for dealing five (or more) hands merely by increasing the number of card receptacles and providing stops on the notched selector plate of five (or more) different depths instead of four.

Theory of the method of dealing

The notched control plate or selector 284 is so formed that there are, of course, thirteen notches of each depth, with the result that each of the card receptacles S, W, N, E, will have received thirteen cards upon the completion of the dealing operation. Since the notched plate 284 makes a complete revolution during the time that the mechanism is actually operating to distribute the cards, the initial angular position of the notched selector plate with respect to the lug 282 is relatively immaterial.

In the notched control plate illustrated, the sequence of the notches of the different depths has been mathematically determined as most closely (and nearly perfectly) approximating the order in which the cards would have to be dealt to obtain the same hands that would have been manually dealt in regular sequence after a perfect shuffling operation.

The following is an illustration of the mathematical problem of which the above listed sequence is the solution: Assume that four hands of thirteen cards each have been dealt, and a record made of the cards in each hand. Further assume that all of the cards are reassembled and perfectly shuffled together. The problem is to determine in what order the cards must be redealt one after another, from the deck so that each player is to have the hand of which he previously made a record. It will be found by the mathematical theories of probability, that the cards will most probably have to be dealt in a sequence of the general type above listed, that is, with each hand receiving at intervals one group of three cards in sequence, two groups of two cards in sequence, and six distributed single cards.

From the above, it will be apparent that I have devised a novel method of dealing playing cards, by which the shuffling operation is eliminated. This novel method of my invention may be utilized in manually dealing cards, in which event the dealer will preferably memorize the order in which the cards are to be dealt and deal the cards in this order, preferably commencing at a different point in the series for each deal.

This method of dealing cards, in which the shuffling operation is effected during and as an incident to the dealing operation, may be appropriately termed "shuffle dealing".

It will be readily apparent to those skilled in the art that the embodiment of my invention herein illustrated is but one of a large number of possible constructions in which the salient features of my invention may be incorporated. I therefore do not desire the following claims to be limited in their construction to the embodiment herein disclosed, but desire to include in the scope of my invention all such equivalents and variations as may be readily suggested to those skilled in the art.

I claim:

1. In a machine of the class described, the combination of means for holding a deck of playing cards, an inclined runway adjacent said means, a guide element engageable with the top card of the deck of cards, a spring for holding said guide element away from said deck, and a picker device mounted for movement across the top of the deck of cards and having a friction part engageable with the topmost card of the deck, said picker device being resiliently pressed against said deck by a spring relatively stronger than the spring on said guide element, said picker device being guided by said element so as to approach the surface of the topmost card of the deck at an acute angle and operable to release said element for retraction by its spring at substantially the instant of contact of said friction part with the surface of the topmost card, the topmost card being thereby slid from the deck upon said inclined runway to separate it from the next adjacent card or cards which may have adhered to it.

2. In a mechanism of the class described, the combination of means for holding a deck of playing cards in superimposition, picker means for sliding the topmost card of a deck from the deck, means for separating the topmost card from the next lower card or cards which may have adhered initially to the topmost card, and means for restoring all displaced cards except the topmost card to normal position.

3. In a machine of the class described, the combination of means for supporting a deck of cards in superimposition, a picker movable across the top of the deck, and means for guiding said picker into contact with the topmost card of the deck so that it will approach and contact with the surface of the latter at an acute angle.

4. In a machine of the class described, the combination of means for supporting a deck of playing cards, automatically operable means for sliding the topmost card of the deck therefrom, means for restraining appreciable displacement of the other cards of the deck, and means for restoring slightly displaced cards to normal position.

5. In a machine of the class described, a card feeding mechanism comprising means to hold a deck of playing cards in regular stacked formation, means engageable with the topmost card at an acute angle of incidence to slide the topmost card from the deck, an inclined runway for the topmost card arranged to separate it from any cards which may adhere thereto, and means for restoring the cards remaining in the stack to normal position subsequent to the removal of the topmost card.

6. In a machine of the class described, the combination of a container having its top and one side open for holding a deck of playing cards in approximate superposition, a guide engageable with the top of a deck of cards placed in said container, resilient means to hold said guide away from said deck, a friction device for sliding the topmost card of the deck therefrom, said device having a part engageable with said guide to move the latter into contact with the topmost card of the deck thereby to govern the path through which the device moves in accordance with the thickness of the stack of cards in said container.

7. In a device of the class described, the combination of a container for a stack of playing cards having an open top and side, a single card removing device movable in a path over the top of said container and resiliently pressed toward the stack of cards, and means for controlling the extent of movement of said device toward said stack of cards in accordance with the thickness of the stack.

8. In a device of the class described, the combination of a card table having shallow side walls with a plurality of card receiving pockets formed therein, a tray slidable through an opening formed in one of said side walls, said tray having means for receiving a stack of playing cards and holding them in substantial superimposition, mechanism mounted beneath the top of said table for removing the cards of the stack from said tray successively and distributing said cards to said receiving pockets, a motor for operating said mechanism, a switch for said motor, means for closing said switch upon insertion of said tray in operative position, means for latching said tray in its operative position throughout the period of operation of said distributing mechanism, and means for releasing said tray and opening said switch after all of the cards have been removed from the tray and distributed to said receiving pockets.

9. In a device of the class described, the combination of a dealing mechanism, means for inserting a stack of cards in position for operative engagement by said dealing mechanism, a latch for locking said means in said position, and means actuated upon the completion of the operation of said dealing mechanism to release said latch.

10. In combination, a card table having a narrow side wall formed with a plurality of openings therein, and automatically operable means mounted beneath the top of the table for dealing cards inserted in one of said openings to the other openings.

11. In combination, a card table having an imperforate top, and mechanism mounted directly beneath said top to receive a stack of playing cards and deal the latter to receptacles adjacent the normal positions of the players around the table in one of a large plurality of predetermined irregular sequences.

12. In a device of the class described, the combination of a card table having a plurality of card receptacles positioned closely adjacent the top thereof, a circular track positioned beneath said top and passing adjacent each of said receptacles, means at said receptacles for switching a card from said track to said receptacle, means for carrying playing cards one at a time over said track, and means for controlling said switching means to determine the receptacle into which the card is delivered.

13. In a card dealing machine, the combination of means for successively removing the cards from a stack, a plurality of card receptacles, and means for individually conveying the cards removed from said stack and depositing each in one of said receptacles in one of a plurality of possible determined irregular orders.

14. In a device of the class described, the combination of a card table having a plurality of receptacles for receiving cards positioned so as to be readily accesssible to the respective players, designated S, W, N, E, respectively, and mechanism operable automatically upon the insertion of a standard deck of playing cards successively to distribute said cards to the receptacles adjacent the players in an order substantially equivalent to the following repetitive sequence starting at any point therein: W, S, E, E, W, N, S, S, S, W, E, N, N, S, E, W, W, N, S, E, E, E, N, S, W, W, E, N, S, S, E, W, N, N, N, S, W, E, E, W, N, S, S, E, N, W, W, W, S, E, N, N.

15. In a machine of the class described, the combination of a card deck tray movable into and out of operative position, dealing mechanism operable to remove cards successively from said tray and distribute them into separate hands, said means including a card contacting member, a latch to hold said tray in operative position, and means operated by said member to release said latch after all of the cards have been removed from said tray.

16. In a device of the class described, the combination of a card deck tray movable into and out of operative position, dealing mechanism operable to remove cards successively from said tray and distribute them into separate hands, an electric motor for driving said mechanism, a switch for connecting said motor to a source of electric power, means for closing said switch upon movement of said tray into operative position, and means operable upon completion of a dealing operation of said mechanism to open said switch.

17. In a device of the class described, the combination of a card table having a card dealing mechanism incorporated therein, driving means for said mechanism, means operative upon feeding a stack of playing cards to said mechanism to render said driving means operative, and means controlled by said mechanism to render said driving means inoperative.

18. In a device of the class described, the combination of a motor, a member rotated thereby, a cam fixed at the axis of rotation of said member, an element slidable radially on said member and moved by said cam, a notched selector mounted upon said member, means to shift said selector upon a predetermined angular displacement of said member, a part on said element cooperable with said selector differentially to position said element relative to said member, and card distributing means governed by said element.

19. In a device of the class described, the combination of a card table having a plurality of spaced card receiving pockets therein, a circular track adjacent said pockets, means to deflect cards from said track to said pockets, a power operated member rotatable about an axis concentric with said track, an arm extending from said member for conveying a card along said track, and means carried by said member to render said deflecting means operative to deflect a card being conveyed along said track into one of said pockets.

20. In a device of the class described, the combination of a card table having a plurality of spaced card receiving pockets therein, a circular track adjacent said pockets, means to deflect cards from said track to said pockets, rods extending generally toward the center of said track for operating said means, a power operated member rotatably mounted at the center of said track, and selective means carried by said member to operate said deflecting means in a predetermined sequence by means of said rods.

21. In a device of the class described, the combination of a plurality of playing card receiving pockets, a circular track having a portion adjacent each of said pockets, a member rotatable about an axis concentric with that of said track, a card conveying means having one end supported by said track and the other end pivotally secured to said member, means associated with each pocket to switch a card from said track to the pocket, and means carried by said member for operating said switching means in a predetermined irregular order.

22. In a device of the class described, the combination of a motor, a member rotated thereby, an element mounted for reciprocation upon said member and having a cam follower surface, a stationary cam cooperable with the follower surface of said element, resilient means to move said element toward said cam, and a selector control plate engageable by a part of said element selectively to control the extent of movement of said element in one direction.

23. In a device of the class described, the combination of a card track having side rails, means for holding a deck of playing cards in alignment with said track, a member rotatable about an axis concentric with said track and having a part frictionally engageable with a card and movable perpendicular to the plane of the track for removing the cards from the inserted deck one at a time and sliding them upon said track, and cams formed on one of the side rails of said track to control said perpendicular movement of said member.

24. In a device of the class described, the combination of a plurality of card receiving pockets, a circular track formed in sections separated from one another adjacent said pockets, respectively, a switch member comprising a bent wire which when in normal position provides a bridge across the gap between the sections of said track and, when moved to operative position, presenting a surface for deflecting a card from said track into the adjacent pocket.

25. In a device of the class described, the combination of a track formed in sections spaced from one another, a card receptacle positioned adjacent the end of each track section, and a switch positioned between adjacent track sections, said switch forming a continuation of the track when in normal position and, when in operating position, forming means to deflect a card conveyed along said track into the receptacle adjacent the deflecting switch.

26. A selector device for a card dealing mechanism, having a plurality of stop faces located four different distances from its axis, said distances being represented as S, W, N, E, and said faces being arranged in a sequence of substantially the following type: W, N, N, E, S, W, W, W, N, E, S, S, N, W, E, E, W, S, N, N, N, W, E, S, S, N, E, W, W, S, N, E, E, E, S, N, W, W, E, S, N, N, E, W, S, S, S, N, W, E, E, S.

27. A selector device for a card dealing mechanism having fifty-two stop faces located at four different distances from its axis there being thirteen stop faces at each distance and some of the stop faces at each distance being arranged in spaced groups, one group of three, and two groups of two, the remaining six stop faces at each distance being irregularly distributed among the stop faces of other distances.

28. In a card dealing mechanism, a track, and means for sliding playing cards along said track comprising a carrier guided by said track and a resilient buffer supported by said carrier and engageable with the edge of a playing card so as resiliently to engage the card and push it along said track.

29. A selector device for a card dealing mechanism having fifty-two stop faces located at four different distances from its axis, there being thirteen stop faces at each distance and the order of recurrence of the distances to the stop faces around said axis being generally irregular.

30. In combination, a card table having an imperforate top with card receptacles formed at the side walls thereof, and power operated mechanism mounted directly beneath said top operative to receive a stack of playing cards and deal the latter to said receptacles in one of a large plurality of predetermined sequences.

31. In a device of the class described, the combination of a plurality of card receptacles, means for delivering cards one at a time to said receptacles, and control means for determining the order of delivery of the cards to the different receptacles comprising a one piece selector having a plurality of notches of a plurality of different depths, the arrangement of the notches determining the order in which the cards will be delivered to said receptacles respectively.

32. In combination, a bridge table having an imperforate top and narrow side walls, said walls having card receptacles supported by said walls, and hinged legs; and a card distributing mechanism mounted beneath said imperforate top and operative to deliver separate hands of cards to said receptacles.

33. In combination, a table having a removable imperforate top and a compartment located beneath said top and accessible upon removal of the top, said compartment having apertured side walls and an automatic card dealing mechanism mounted beneath said top within said compartment and comprising receptacles positioned at spaced intervals adjacent the apertures in said side walls for receiving the cards dealt, each of said receptacles being positioned so as to be conveniently accessible to one of the players seated at the table and concealed from the remaining players.

34. In combination, a card table having a top, narrow side walls and folding legs; an automatic card dealing mechanism mounted beneath said top, means for feeding a deck of playing cards to said mechanism, said means being operable through one of the side walls of said table, and a plurality of card receptacles, one at each side of said table positioned to receive cards dealt by said mechanism and accessible for withdrawal of cards therefrom by the players through openings formed in said side walls.

35. In a device of the class described, the combination of a card table having a compartment with apertured side walls, receptacles located adjacent said side walls adapted to receive the separate hands of cards in position for withdrawal by the respective players, means readily operable from the position normally assumed by one of the players seated at the table for inserting a deck of playing cards in said compartment in a predetermined position, and means located within said compartment automatically operable upon insertion of a deck of cards in said position for successively distributing an equal number of said cards to each of said receptacles in one of a plurality of predetermined irregular sequences.

36. A card table comprising a box having rigid side walls, a fixed bottom, and an imperforate removable top; and a card shuffle dealing mechanism mounted within said box independently of said top and supported solely by said side walls.

37. A card table comprising a shallow box having an imperforate top, said top forming the playing surface for the table, supporting legs hinged to said box, and automatically operable card dealing mechanism mounted within said box, said mechanism being supported solely by the sides of said box independently of said top and being accessible for inspection by the removal of said top.

38. A card table comprising four side walls rigidly secured together, each of said side walls having a card delivery opening therein, and one of said side walls having a deck receiving opening therein, supporting legs hinged to said side walls, a bottom secured to the lower edges of said side walls, a top removably secured to said side walls, and a card distributing mechanism automatically operable successively to convey cards inserted in said deck receiving opening to said card delivery openings.

39. A card table comprising a compartment having rigid side walls, said walls having a plurality of card receptacles secured thereto, a deck receiving device supported by one of said side walls, a bottom closure secured to said walls, a top removably secured to said walls, and a card dealing mechanism enclosed by said walls, top, and bottom closure and operable automatically to deal cards inserted in said receiving device to said card receptacles, said mechanism being supported substantially wholly by said walls.

40. A card table comprising a large shallow box having a top suitable as a playing surface, folding legs supporting the box, automatic card shuffle dealing mechanism mounted within said box, said box and mechanism being constructed and arranged to receive a deck of playing cards through an opening in a side wall of said box and distribute the cards into four hidden and private receptacles within the box, each of said receptacles being located so as to be readily accessible through the side of the box from only one playing position.

41. A card table comprising a shallow box having side walls with five openings formed therein, the top of said box having a smooth surface suitable for use in playing cards, receptacles within the box adjacent four of said openings, said receptacles being positioned and arranged so as to be individually private, one to each of four players seated about the table, and an automatically operable card dealing mechanism mounted in said box and constructed and arranged to receive a deck of playing cards through the fifth of said openings and deal the cards to said receptacles.

42. A card dealing mechanism arranged to be incorporated in the top of a card table comprising, a card track, a deck receiver below the level of said track, a plurality of card receptacles spaced along said track at substantially the level of said receiver, and means for distributing cards from said deck receiver to said receptacle along said track, whereby said mechanism will occupy a minimum of space in the vertical direction.

43. A card dealing mechanism arranged to be incorporated in a card table comprising, a deck receiver, a plurality of card receptacles located at substantially the same level as said receiver, and means for successively removing cards from said deck receiver and distributing them to said receptacles, said means being constructed and arranged to carry the cards in a path above said receptacles.

44. In a device of the class described, the combination of a card table with an imperforate top and having a dealing mechanism incorporated therein, means for inserting a stack of cards into position for operative engagement by said dealing mechanism, a latch for locking said means in said position, and means actuated upon completion of the operation of said dealing mechanism to release said latch.

45. In a device of the class described, the combination of a card table having a plurality of spaced card receptacles therein, a track adjacent said receptacles, means to deflect cards from said track to said receptacles, and a power operated member arranged to operate said deflecting means in one of a plurality of predetermined irregular sequences.

46. In a device of the class described, the combination of a track, a deck receiver, a plurality of card receptacles adjacent said track, means for switching cards from said track to said receptacles, means for successively conveying cards from said receiver along said track, and a selector mechanism for controlling the operation of said switching means.

47. In a card dealing machine, the combination of a deck receiver, a plurality of hand collecting receptacles, card conveying means for sequentially removing cards from said receiver and carrying them along a predetermined path, and automatically operating selector means for deflecting cards being moved by said conveying means from said path into one of said hand collecting receptacles.

48. In a card table having a box-like top, a track mounted within said top, card receptacles within said top, and positioned at spaced intervals around the periphery thereof below the level of said track, means for guiding a deck of playing cards to a predetermined position within said top beneath said track, and means to lift cards successively from a deck of cards in said position and selectively to drop them into said receptacles.

49. A portable folding card table comprising a box-like top having rigid side walls, supporting legs hinged to said walls, a relatively light weight bottom secured to said walls, and a card dealing mechanism mounted within said box-like top and resiliently supported from said side walls.

50. In combination, means for holding a stack of cards in approximate superimposition, picker means for frictionally engaging the surface of the topmost card of the stack and sliding it from said stack, an inclined barrier spaced from the edge of a stack of cards in normal position in said stack holding means and arranged to hinder extensive movement of all except the topmost card, and periodically operating means to restore cards which have been slightly displaced from their normal position to their original superimposition.

51. In a card table, a dealing mechanism, an electric motor for operating said mechanism, a spring opened switch for controlling said motor, a device for feeding a deck of cards to said mechanism and arranged to close said switch against the force of the spring of the latter, and a latch for holding said device in its switch closing position, whereby upon release of said latch said switch spring will open said switch and simultaneously displace said device.

In witness whereof, I hereunto subscribe my name this 8th day of October, 1932.

LAURENS HAMMOND.